Nov. 6, 1951  J. E. COLLINS ET AL  2,574,171
TIRE SIDE WALL MOLD
Filed May 6, 1947  2 SHEETS—SHEET 1
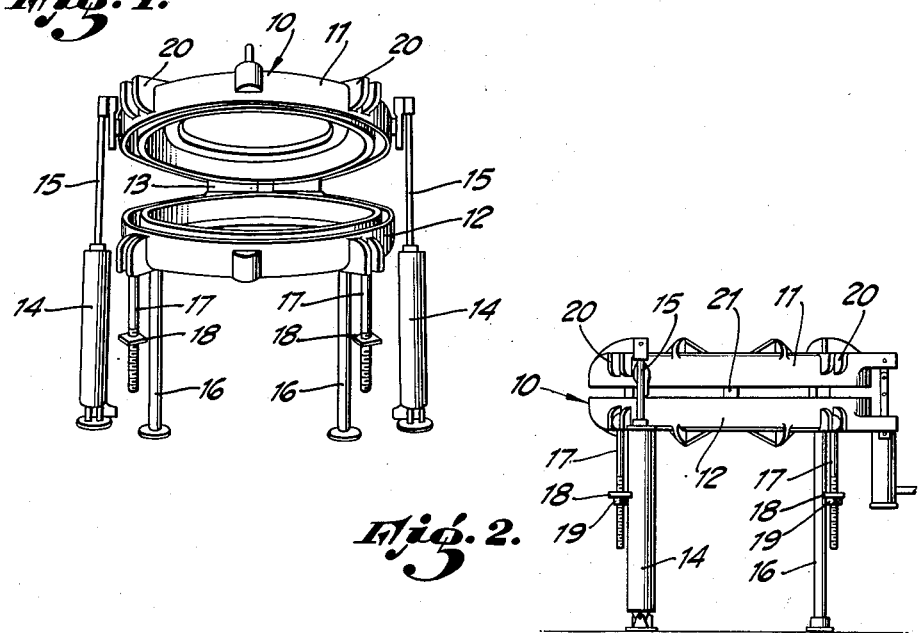
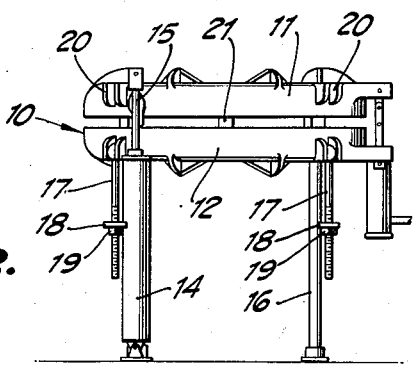
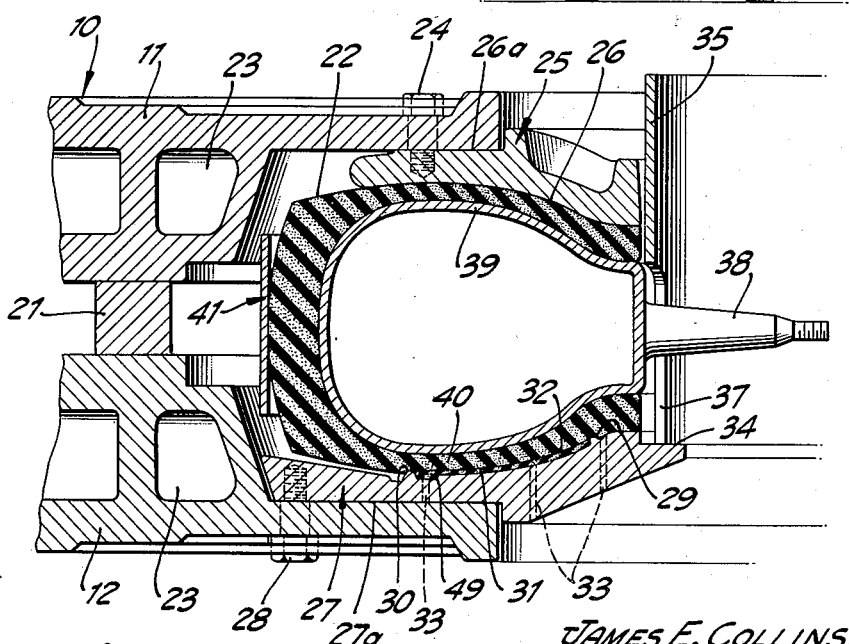
JAMES E. COLLINS,
ARTHUR W. DOUGLAS,
INVENTORS
BY Lyon & Lyon
ATTORNEYS.

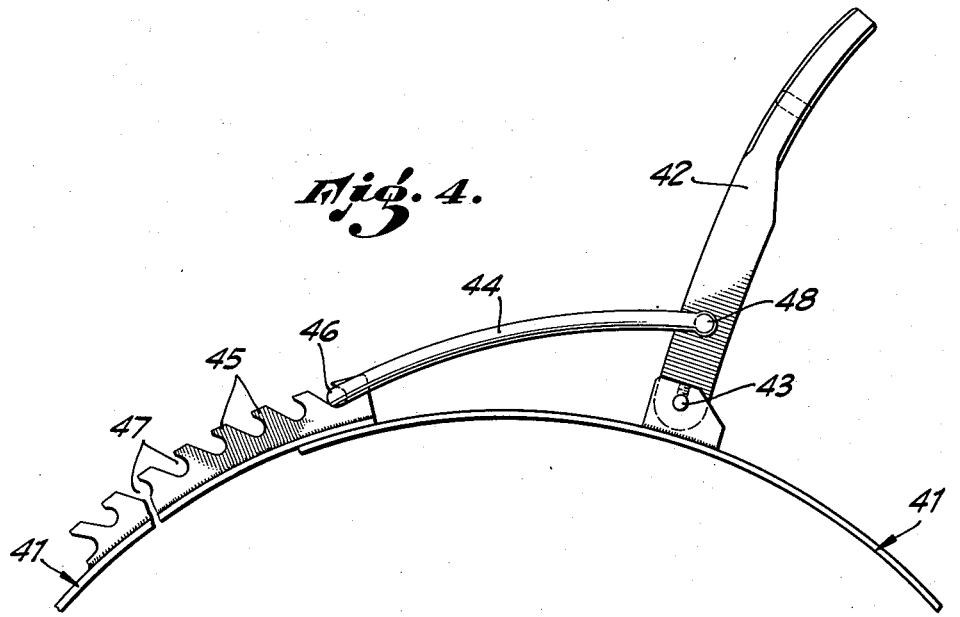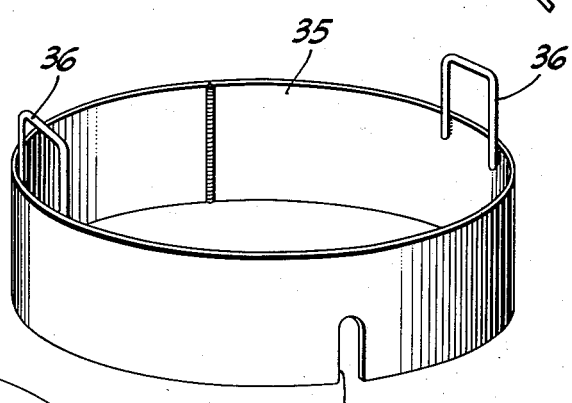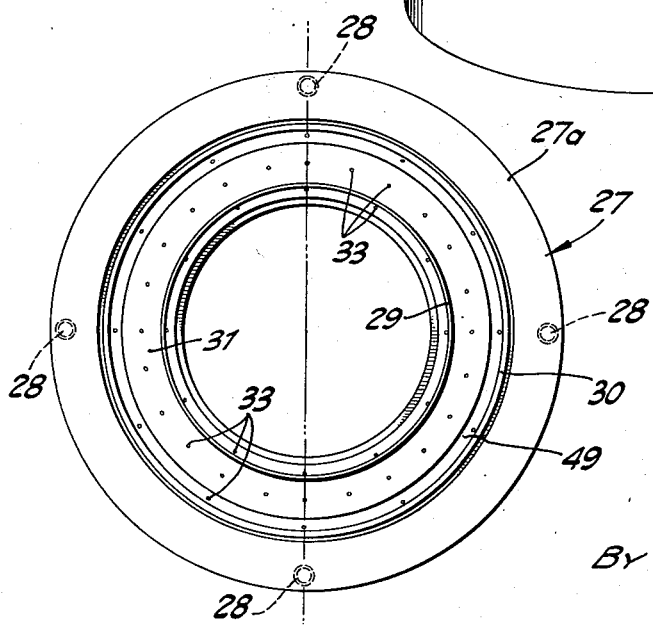

Patented Nov. 6, 1951

2,574,171

UNITED STATES PATENT OFFICE 2,574,171

TIRE SIDE WALL MOLD

James E. Collins, Maywood, and Arthur W. Douglas, Los Angeles, Calif., assignors to American Tire Machinery, Inc., Los Angeles, Calif., a corporation of California Application May 6, 1947, Serial No. 746,302

5 Claims. (Cl. 18—18)

This invention relates to a tire side wall mold and is particularly directed to apparatus for vulcanizing a side wall to a tire within a recapping and retreading mold.

Retreading and recapping molds are well known in the art and are commercially available but the uses of this conventional equipment are confined mainly to replacing rubber or rubber-like material on the tread or shoulders of the tire after it has become worn in service.

The principal object of this invention is to provide a novel form of apparatus for adapting such conventional type molds for vulcanizing a new side wall to a new or used tire. The purpose of vulcanizing a new side wall on a tire may be principally for ornamental reasons or for structural improvement of the tire side wall. The new side wall may be white or colored, depending on the color of rubber-like material which is to form the new exterior surface of the tire side wall. The rubber-like material to be applied is in the form of a thin annular sheet and is vulcanized to the tire under conditions of pressure and heat.

Another object of this invention includes the provision of an assembly for vulcanizing an annular sheet to the side wall of the tire, the tire being mounted within cooperating mold halves and being contacted on its side walls by matrices removably supported within the mold halves.

Another object is to provide a device of this type including a removable nonresilient adjustable band encircling the tire within the mold adapted to prevent radial expansion of the tire.

Another object is to provide such a device in which removable spacer blocks are mounted between the cooperating mold halves in order that a particular set of matrices may be used for tires of different nominal widths.

Another object is to provide a new and improved method of vulcanizing an annular sheet to the side wall of a tire in order to produce a sharp line of demarcation between the outer circumference of the sheet and the exposed portion of the tire side wall.

Other objects and advantages will appear hereinafter.

In the drawings:

Figure 1 is a perspective view of a tire vulcanizing mold showing separable mold sections in partly open position.

Figure 2 is a side elevation of the tire vulcanizing mold illustrated in position for vulcanizing a new side wall surface on a tire.

Figure 3 is a transverse sectional elevation, partly broken away, of the mold shown in Figures 1 and 2 and illustrating a preferred form of our invention.

Figure 4 is a partial side elevation showing the details of construction of the adjustable band employed in connection with our invention.

Figure 5 is a perspective view of the nonresilient internal ring.

Figure 6 is a plan view of the side wall matrix.

Referring to the drawings, the tire vulcanizing and recapping mold assembly illustrated in Figures 1 and 2 may be of the general type illustrated in the Cleveland Patent No. 2,231,254, granted February 11, 1941, or may be of any conventional type employing a full circle split ring mold.

As shown in the drawings, the mold body generally designated 10 includes an upper mold section 11 and a lower mold section 12 joined by a connection mechanism 13. Power cylinders 14, acting through rods 15, are adapted to open and close the mold as desired. The mold body 10 may be supported in any convenient fashion, such as, for example, the legs 16.

Means are provided for clamping the mold sections in operative position and, as shown in the drawings, this means may include the eyebolts 17, which are pivotally mounted on the lower mold section 12 and which carry washers 18 and nuts 19. The bolts may be swung from the inoperative position shown to a position between cooperating lugs 20 provided on the upper mold section 11, and in such position tightening of the nuts serves to clamp the mold sections against separation.

The movable spacer blocks 21 are provided for adjusting the spacing of the mold sections in the closed position in order to compensate for varying nominal widths of the tire 22 enclosed by the mold.

The upper and lower mold sections 11 and 12, respectively, are provided with the usual steam chambers 23. Secured to the upper mold section 11 by any conventional means, such as, for example, the threaded connections 24, is an upper matrix 25 having an annular surface 26 curved to conform to the side wall of the tire 22, which is received within the mold body 10. The side wall matrix 27 is secured to the lower mold section 12 by means of threaded connections 28. This side wall matrix is also curved to conform to the side wall of the tire. The surface 26–a on the upper matrix 25 is considerably less in extent than the surface 27–a of the side wall matrix 27 and is positioned remote from the steam chambers 23, with the result that the upper matrix 25 is held below vulcanizing temperature.

Inner and outer concentric beads 29 and 30 are integrally formed on the side wall matrix 27 and project toward the tire 22. The annular surface 31 extending between the beads 29 and 30 is adapted to receive an annular sheet 32 of rubber-like material which is to form the new side wall surface of the tire. The sheet 32 is commonly white in color although it may be of any other desired color. Vent holes 33 are provided in the matrix 27 leading from the surface 31 to the back side of the matrix. An annular ledge 34 is provided on the inner circumference of the side wall matrix 27 and is adapted to support a nonresilient inside pressure ring 35. This ring 35 is provided with handles 36 to facilitate manual installation and removal of the ring 35 within the mold body 10. Pressure rings of various diameters may be provided to accommodate different tire sizes. A cutout slot 37 is provided in the ring 35 through which the valve 38 of the air bag 39 is adapted to extend. The air bag 39 fits within the tire 22 and serves to expand the tire in every direction and thereby maintain the annular sheet 32 in compression between the tire side wall 40 and the surface 31 of the matrix 27.

Means are provided for preventing radial expansion of the tire 22 and, as shown in the drawings, this means includes a nonresilient adjustable band generally designated 41. This band is mounted on the tire 22 prior to its installation within the mold body 10 and is adjustable to compensate for varying diameters of the tire. This is essential since worn tires vary considerably in outside diameter.

A lever 42 pivotally mounted on the band 41 at 43 is connected by a link 44 to a fitting 45 secured on the opposite end of the band 41. The end 46 of the link 44 remote from the lever 42 is adapted to enter any one of a plurality of openings 47 provided in the fitting 45. The band assembly is first placed around the tire with the lever in its released position. The end 46 of the link 44 is then engaged in one of the notches 47 and the lever 42 swung in a clockwise direction as viewed at 44 until the lever 42 lies adjacent the band 41, as viewed in Figure 4.

In such a position the tire is radially confined by the nonresilient band and the linkage arrangement is such that the forward end 48 of the link passes over center with respect to the pivot 42 and there is, accordingly, no tendency for the lever 42 to return towards its extended position.

The annular sheet 32 is positioned on the matrix 27. After the nonresilient band 41 has been mounted on the tire 22 and the tire installed within the mold body 10, insert blocks 21 are mounted between the mold sections for proper spacing of the matrices 25 and 27. The mold sections are then clamped on the spacer members 21 by means of the power cylinders 14 and the eye-bolts 17 are then utilized to clamp the mold sections 11 and 12 in position.

Pneumatic pressure is then admitted into the air bag 39 through the valve 38 to expand the tire into engagement with the matrices and annular sheet 32, and to imbed the bead rings 29 and 30 into the side wall 40 of the tire. The sheet 32 is thus maintained under compression between the tire side wall 40 and the surface 31 of the matrix 27. Steam is then admitted into the steam chambers 23 for the purpose of heating the matrix 27. The heat and pressure to which the annular sheet 32 is subjected serves to vulcanize the sheet to the tire side wall 40.

The annular beads 29 and 30 prevent flow of the material of the sheet 32 laterally beyond the position of the beads.

If desired, an annular groove 49 may be provided in the side wall matrix 27 adjacent the outer bead ring 30. During the vulcanizing operation, the rubber from the annular sheet 32 flows into this groove and simulates a "beauty-rib" on the finished tire.

After a suitable interval of time has elapsed, pressure within the air bag 39 is released and the eye-bolts 17 are swung back to their inoperative position. The power cylinders 14 are then energized to lift the upper mold section 11 away from the lower mold section 12 to expose the tire 22. The tire and band assembly 41 are removed from the mold as a unit. The band is then mounted on another tire and the operation is repeated.

Having fully described our invention, it is to be understood that we do not wish to be limited to the details herein set forth, but our invention is of the full scope of the appended claims.

We claim:

1. In a tire vulcanizing mold, the combination of a pair of cooperating mold sections adapted to receive a tire, the mold sections being separable along a plane normal to the tire axis, an annular matrix removably mounted in each of the mold sections and curved to conform to the contour of one side wall of the tire, concentric bead rings on one of said matrices defining inner and outer boundaries of an annular sheet confined between that matrix and the tire, an adjustable non-resilient band removably mounted on and encircling the tire to prevent radial expansion thereof, a non-resilient ring disposed within the tire, and pressure means within the tire for maintaining the tire side walls in pressure contact with said matrices.

2. In a device for vulcanizing a thin annular sheet of rubber-like material to the side wall of a tire, the combination of a mold body adapted to receive a tire, said mold body comprising a pair of mold sections separable along a plane normal to the tire axis, an annular matrix removably mounted in each of said mold sections and curved to conform to the contour of one side wall of the tire, one of said matrices being adapted to receive said annular sheet of rubber-like material, said one matrix having a relatively large surface contact with its respective mold section, the other matrix having a relatively small surface contact with its respective mold section, and means to heat both of said mold sections, whereby the matrix having the large surface contact may be heated to a temperature higher than the matrix having the small surface contact.

3. In a device for vulcanizing a thin annular sheet of rubber-like material to the side wall of a tire, the combination of a mold body adapted to receive a tire, said mold body comprising a pair of mold sections separable along a plane normal to the tire axis, an annular matrix removably mounted in each of the mold sections, one of said matrixes adapted to support the thin annular sheet in position against the tire side wall, inner and outer concentric bead rings on the latter matrix adapted to be coextensive with the inner and outer circumferences of the thin annular sheet, a non-resilient adjustable band encircling the tire within the mold body and adapted to prevent radial expansion of the tire, means in the tire adapted to maintain the thin annular sheet under pressure between the said matrix and the tire side wall, and means on the mold body adapted to heat the matrix.

4. In a device for vulcanizing a thin annular sheet of rubber-like material to the side wall of a tire, the combination of a mold body adapted to receive a tire, said mold body comprising a pair of mold sections separable along a plane normal to the tire axis, an annular matrix removably mounted in each of the mold sections, one of said matrixes adapted to support the thin annular sheet in position against the tire side wall, inner and outer concentric bead rings formed integrally on the latter matrix and defining an annular ring to receive the thin annular sheet, a non-resilient adjustable band removably mounted on and encircling the tire within the mold body and adapted to prevent radial expansion of the tire, fluid pressure means in the tire adapted to maintain the thin annular sheet under pressure between the said matrix and the tire side wall, and means on the mold body adapted to heat the matrix.

5. In a device for vulcanizing a thin annular sheet of rubber-like material to the side wall of a tire, the combination of a mold body adapted to receive a tire, said mold body comprising a pair of mold sections separable along a plane normal to the tire axis, removable spacer blocks interposed between the mold sections, releasable means for maintaining the mold sections against separation, an annular matrix removably mounted in each of the mold sections and adapted to support the thin annular sheet in position against the tire side wall, inner and outer concentric bead rings on the latter matrix adapted to be coextensive with the inner and outer circumferences of the thin annular sheet, a non-resilient adjustable band encircling the tire within the mold body and adapted to prevent radial expansion of the tire, means in the tire adapted to maintain the thin annular sheet under pressure between the said matrix and the tire side wall, and means on the mold body adapted to heat the matrix.

JAMES E. COLLINS.
ARTHUR W. DOUGLAS.

REFERENCES CITED

The following references are of record in the file of this patent:

UNITED STATES PATENTS

| Number | Name | Date |
| --- | --- | --- |
| 2,181,558 | Beckman | Nov. 28, 1939 |
| 2,319,447 | Drennan | May 18, 1943 |

FOREIGN PATENTS

| Number | Country | Date |
| --- | --- | --- |
| 418,930 | Great Britain | Nov. 2, 1934 |